June 26, 1945.  M. P. MATUSZAK  2,379,172
PREPARATION OF CATALYST AND METHOD FOR
DEHYDROGENATING HYDROCARBONS WITH SAME
Filed Feb. 5, 1942

```
┌─────────────────────────────────────────┐
│ ADDITION, WITH STIRRING, OF CONCENTRATED│
│   AQUEOUS AMMONIUM HYDROXIDE TO         │
│   CONCENTRATED AQUEOUS SOLUTION OF      │
│            SALT OF METAL                │
└─────────────────────────────────────────┘
                    ↓
          SOL OF METAL HYDROXIDE
                    ↓
        ┌─────────────────────┐
        │  DILUTION WITH WATER │
        └─────────────────────┘
                    ↓
┌─────────────────────────────────────────┐
│          ADDITION OF SOL TO             │
│     DILUTE AQUEOUS AMMONIUM             │
│   HYDROXIDE NOT OVER 0.1 NORMAL         │
└─────────────────────────────────────────┘
                    ↓
          GELATINOUS HYDROXIDE
                    ↓
        ┌─────────────────────┐
        │ SEPARATION FROM SOLUTION │
        └─────────────────────┘
                    ↓
            ┌─────────┐
            │ WASHING │
            └─────────┘
                    ↓
            ┌─────────┐
            │ DRYING  │
            └─────────┘
                    ↓
          METAL OXIDE CATALYST
```

INVENTOR
MARYAN P. MATUSZAK
BY *Hudson, Young and Yinger*
ATTORNEY

Patented June 26, 1945

2,379,172

UNITED STATES PATENT OFFICE 2,379,172

PREPARATION OF CATALYST AND METHOD FOR DEHYDROGENATING HYDROCARBONS WITH SAME

Maryan P. Matuszak, Bartlesville, Okla., assignor to Phillips Petroleum Company, a corporation of Delaware Application February 5, 1942, Serial No. 429,703

19 Claims. (Cl. 260—683.3)

This invention relates to the preparation of catalysts, and more particularly to the preparation of gel-type metallic oxide catalysts. Still more particularly it relates to the use of such catalysts in the conversion of hydrocarbons, such as dehydrogenation, hydrogenation, cracking (including reforming), desulfurization, etc., and especially the dehydrogenation of hydrocarbons such as of paraffins to olefins or diolefins, of olefins to diolefins, of saturated alicyclic olefins or diolefins, etc. The catalysts prepared in accordance with the present invention may also be used in the dehydrogenation and cyclization of paraffins to aromatics, e. g. hexane to benzene, heptane to toluene, etc.

The preparation of such catalysts in accordance with previous practice involves precipitation of each desired metallic element as a gelatinous hydroxide or hydrous oxide capable of being dried to a gel. Heretofore, the common practice of effecting this precipitation has been to add slowly a dilute solution of a soluble alkaline hydroxide to a dilute solution of a soluble salt of the desired metallic element. Dilute solutions are used to minimize adsorption or occlusion of undesired salts by the precipitate, and the precipitation is conducted slowly, sometimes during a period of several hours or more, to favor formation of a gelatinous or hydrous precipitate; rapid precipitation in a dilute solution favors formation of a nongelatinous precipitate unsuitable for the preparation of a gel. The precipitation is sometimes expedited somewhat by adding a concentrated solution of the soluble alkaline hydroxide to a relatively concentrated solution, such as a molar solution, of the metallic salt until the unreacted salt is insufficient to redissolved or peptize additional amounts of the transitory precipitate that is formed; then the resulting mixture is diluted, and the gelatinous precipitate is formed as in the customary manner by slow addition with stirring of a relatively dilute solution, such as a 0.1 to 0.2 normal solution, of the soluble alkaline hydroxide to the diluted mixture. The procedure just described is shown in Ruthruff, U. S. Patent No. 2,156,904.

It is an object of this invention to prepare catalysts by a method involving precipitating metallic elements as hydroxides or hydrous oxides in a manner that favors development to the maximum degree of the gelatinous character of the precipitate.

It is another object of this invention to prepare catalysts substantially more rapidly than in the prior practice, by an improved method involving precipitation of a gelatinous mass suitable for drying to a gel-type catalyst.

Another object is to prepare catalysts having higher activity for hydrocarbon conversion such as dehydrogenation of paraffin hydrocarbons to mono-olefins.

Another object is to provide an improved process of hydrocarbon conversion using the improved catalysts aforesaid.

Another object is to promote an improved process of dehydrogenation of paraffins or olefins to olefins and/or diolefins using said improved catalysts.

Other objects and advantages of this invention will be apparent from the following description and the appended claims taken in connection with the accompanying drawing which portrays a flow diagram of one mode of carrying out the invention.

In accordance with a preferred embodiment of the present invention, catalysts are prepared by a method involving precipitation of the desired metallic hydroxides or hydrous oxides in two stages, in the first of which a sol is prepared by the addition of about two thirds of the stoichiometrically equivalent amount of a readily soluble alkaline hydroxide to a concentrated solution of the corresponding metallic salts of one or more monobasic acids, and in the second of which a voluminous gelatinous precipitate is prepared by the addition of the sol resulting from the first stage to a dilute solution of a soluble alkaline hydroxide in slight excess. After the gelatinous precipitate is formed, it is separated and dried to the desired gel-type metallic oxide catalyst.

When an alkali is added to a solution of a metallic salt capable of being precipitated as a gelatinous hydroxide or hydrous oxide, a transitory and generally nongelatinous or incompletely gelatinous precipitate is first formed at the point of addition. This precipitate reacts with the still unreacted metallic salt, thereby becoming peptized or redissolved and forming a sol or colloidal solution of a basic salt; once formed, this sol, on continued addition of the alkali, yields a gelatinous precipitate. If the concentration of the unreacted metallic salt is high, the peptization occurs rapidly; if the concentration is low, the peptization occurs slowly. Thus, because the rate of peptization varies with the concentration of metallic ions, peptization in a dilute solution is generally so slow as to be imperceptible except over relatively lengthy periods. Consequently, rapid precipitation in a dilute solution yields a relatively nongelatinous and unsatisfactory precipitate, and formation of a sol of the basic salt in dilute solution is a long and laborious task, if it is possible at all. In concentrated solution, however, the formation of the sol is relatively rapid, although stirring or agitation for some minutes may be required to peptize all of the transitory precipitate first formed.

Advantage of this fact is taken to save considerable time in the first stage of the precipitation, in which about two thirds of the stoichiometrically equivalent amount of the soluble hydroxide is added without formation of an overpersistent precipitate, which may be defined as one that survives stirring for more than half an hour. Considerably more of the hydroxide may be added in the case of certain metallic salts, without formation of an overpersistent precipitate, but two thirds of the stoichiometrically equivalent amount is generally advantageous in that the ultimate gelatinous precipitate appears to have the greatest dispersion of the precipitated metallic elements, as indicated by the relative volume and the relative water content being maximal, especially in the case of trivalent metallic elements, which are preferred metallic constituents of catalysts prepared in accordance with this invention.

In this first stage, the solution of the metallic salt or salts is concentrated, preferably being at least molar with respect to all the salts of the desired catalytic elements that are present, taken together. It is preferably as concentrated as possible, and in many cases it may be saturated with respect to at least one of the salts. To increase the possible concentration and to expedite the peptization, the rate of which increases with increase in temperature, the solution preferably is heated; any temperature up to and including the boiling temperature may be used. When highly hydrated salts are used, the solution may be advantageously formed simply and quickly by melting and/or dissolving the salt or salts in their own water of crystallization. Among hydrated salts that may be used in this manner are nonahydrates, such as those of aluminum nitrate, chromic nitrate, and ferric nitrate; hexahydrates, such as those of cerous nitrate, cobalt nitrate, cupric nitrate, ferric chloride, ferric nitrate, lanthanum nitrate, magnesium nitrate, manganous nitrate, nickel nitrate, uranyl nitrate, zinc nitrate, and the nitrates of many of the rare-earth metals; and many other meltable hydrates of salts of monobasic acids and polyvalent metals.

The aqueous solution of alkali hydroxide used in the first stage of the process is preferably relatively concentrated, for example, about 10 molar or normal. In the case of ammonium hydroxide, the 28% commercially available solution, which is about 15 molar or normal, is ordinarily employed.

All metallic salts used for the preparation of catalysts in accordance with this invention, regardless of whether or not they are hydrated, preferably should be salts of one or more monobasic acids, preferably those whose ammonium salts are relatively easily volatized or decomposed by heat, such as nitric acid, hydrochloric acid, acetic acid, formic acid, and the like; of these acids, nitric acid is preferred because it forms generally highly soluble metallic salts. Salts of monobasic acids are advantageous for obtaining best results because they are of superior effectiveness for the peptization of the first stage of the precipitation; many salts of polybasic acids, as for example chromic sulfate, appear to be almost incapable of effecting the necessary peptization.

Aside from the requisite of being salts of monobasic acids, the only requisite characteristic of salts suitable for use in the practice of this invention is that of being capable of producing gelatinous hydroxides or hydrous oxides. Suitable salts may contain any of a number of polyvalent metallic elements, among which are aluminum, beryllium, chromium, iron, copper, lanthanum, magnesium, manganese, nickel, rhodium, thorium, uranium, vanadium, zinc, zirconium, and rare-earth metals including cerium, praseodymium, neodymium, ytterbium, hafnium, tantalum, etc.

Naturally, the selection of salts to be used in any particular catalyst preparation depends in some degree upon the proposed use or utility of the ultimate catalyst; however, such selection can be readily made by those skilled in the art of preparing catalysts. For example, if the catalyst is to be used for the dehydrogenation of hydrocarbons, one or more of the salts of aluminum, chromium, uranium, vanadium, and zirconium may be advantageously selected; of these, at least one chromium salt may be preferably included, inasmuch as the resulting catalysts, unless previously subjected to destructive thermal shock, would contain black chromium oxide, which makes them exceptionally active for dehydrogenation of hydrocarbons at relatively low temperatures, such as those in the range of from about 350 to about 550° C. Except as indicated in the appended claims, any possible combination of salts having the requisites mentioned hereinbefore may be employed, in any desired proportions whatever, in so far as the present invention is concerned.

The first stage of the precipitation is completed with the preparation of the sol or colloidal solution of one or more basic salts. In the second stage, this sol is added to such an amount of a dilute solution, preferably not stronger than about 0.1 normal, of a soluble alkaline hydroxide which slightly exceeds that amount necessary to complement the hydroxide previously used in preparing the sol, so that the total hydroxide used in both stages slightly exceeds that stoichiometrically equivalent to the original salt or salts; thereby the desired gelatinous precipitate is formed. The order of mixing of the sol and the hydroxide is important and essential for obtaining the fullest benefit of the invention; the sol must be added to the dilute alkali, not vice versa. This order has a number of distinct advantages. It ensures that the precipitate will have the maximum degree of gelatinousness and the minimum content of undesired adsorbed salts. It ensures that, when at least two metallic elements are to be precipitated, all of the metallic elements are coprecipitated together simultaneously, in the most intimate intermixture, instead of separately or one after the other. It increases the porosity and the activity of the ultimate catalyst, since the precipitate has the maximum dispersion thus far found attainable of the precipitated metallic elements, as is indicated by the volume and the water content of the precipitate being generally greater than in precipitates formed by the reverse order of mixing.

The sol may be diluted before being added to the dilute alkali, but it preferably is undiluted, provided that the mixing is effected with good stirring or agitation, so that it can be added at a rapid rate, with consequent saving of time. The addition preferably is as rapid as is feasible, in order that full advantage may be taken of the fact that the solution in which precipitation occurs has at every moment, from beginning to end, the least practicably possible concentration of adsorbable salts.

After the precipitation is completed, the gelatinous precipitae is separated and dried to form the desired gel-type metallic oxide catalyst. Washing of the precipitate to remove any adsorbed salts, prior to the drying, may be practiced, if desired; but it may be advantageously omitted, if the procedure described herein is faithfully followed, for the described procedure eliminates much of the opportunity present in other precipitation procedures for the precipitate to adsorb salts, and thereby additional time is saved.

In so far as the present invention is concerned, it is most advantageous for the solutions of soluble alkaline hydroxide used in the two stages of precipitation to be aqueous solutions of ammonia. When such solutions are used, the only possible adsorbable salts are ammonium salts, which, however, are relatively easily volatilized or decomposed by heat, and therefore are automatically removed during the drying of the precipitate to the ultimate gel-type metallic oxide catalyst. However, except as specified in the appended claims, other soluble (though usually more expensive) alkaline hydroxides that form volatile salts, such as the hydroxides formed on dissolving in water any of the lower-boiling and soluble amines or alkyl-substituted ammonias, may be used; occasionally, even any of the alkali-metal hydroxides may be used, when the presence in the catalyst of small amounts of adsorbed alkali-metal salts can be tolerated, but ordinarily the alkali-metal hydroxides are preferably avoided. Although the soluble alkaline hydroxide used in the second stage may be different from that used in the first, it is preferred that it be the same throughout.

Some of the many aspects of the invention are illustrated by the following examples.

Example I

To a molar solution of violet chromic nitrate was added rapidly with stirring 70 per cent of the stoichiometrically equivalent amount of 28 per cent ammonia solution. Upon continued stirring of the resulting mixture, the transitory precipitate that was formed was apparently redissolved or was peptized within about half an hour, forming a sol. This sol was diluted to 0.1 normal with respect to the chromium, and then it was added rapidly with stirring to 0.066 molar ammonium hydroxide in slight excess, whereby an exceptionally voluminous dark-green gelatinous precipitate was formed. This precipitate was washed several times with water by decantation, and was filtered. On being dried slowly, it yielded a black vitreous chromium oxide catalyst, designated hereinafter as catalyst A.

When a catalyst, designated hereinafter as catalyst B, was prepared in the same manner except that, in the second stage of the precipitation, the 0.066 molar ammonium hydroxide was added slowly with stirring to the 0.1 normal chromium-containing sol, it had an appearance similar to that of catalyst A; but, in a comparative test of both catalysts for the dehydrogenation of isobutane, at a pressure of 1 atm., at a space velocity of 2000 vol./vol./hr., and a temperature of 445° C., catalyst A consistently effected a conversion of isobutane to isobutylene that was 8 per cent greater than the conversion effected by catalyst B.

Example II

To a quantity of chromic nitrate nonahydrate melted and/or dissolved in its own water of crystallization is added with stirring two thirds of the stoichiometrically equivalent amount of concentrated ammonium hydroxide solution. Continued stirring effects redissolution or peptization of the resulting transitory precipitate within some minutes, the time required being decreased with increase in the temperature. The resulting sol is rapidly added with stirring to a slight excess of an approximately 0.1 normal ammonium hydroxide solution. The resulting very voluminous and highly gelatinous dark green precipitate is separated and dried to a black vitreous gel-type chromium oxide catalyst of high activity for the dehydrogenation of hydrocarbons.

Example III

To a concentrated equimolar solution of chromic nitrate and aluminum nitrate is added with stirring about two thirds of the stoichiometrically equivalent amount of concentrated ammonium hydroxide solution. Continued stirring aided by warming the mixture soon effects redissolution or peptization of the transitory precipitate of hydroxides. The resulting sol is rapidly added with stirring to an excess of an approximately 0.1 molar ammonium hydroxide solution, forming a very voluminous and gelatinous precipitate. When separated and dried, this precipitate yields a dark vitreous gel catalyst having high stability to thermal shocks.

Example IV

To a solution containing chromic nitrate, zirconium nitrate, and cupric nitrate in the approximate molar ratio of 2:1:0.22, respectively, is added with stirring about two thirds of the stoichiometrically equivalent amount of concentrated ammonium hydroxide solution. Continued stirring, aided if necessary by warming the mixture, peptizes the transitory precipitate, forming a sol. This sol is added to a dilute solution of ammonium hydroxide (less than 0.1 normal) in slight excess, whereby the hydroxides of the three metals are coprecipitated in intimate intermixture as a voluminous gelatinous mass. This mass is separated and dried into a gel-type metallic oxide catalyst in which the approximate atomic ratio of chromium, zirconium, and copper is 2:1:0.22, respectively. The resulting catalyst may be advantageously used for the dehydrogenation of hydrocarbons; when used for this purpose, the catalyst may have atomic ratios other than that given, but the proportion of copper should preferably be minor relative to that of either chromium or zirconium.

Example V

To a solution that is approximately molar with respect to both uranyl nitrate and zirconium nitrate is added with stirring concentrated ammonium hydroxide until further addition of ammonium hydroxide forms a precipitate that is not redissolved or peptized within a half hour. Any precipitate remaining unpeptized, if the amount of it appears considerable, is brought into solution by the addition of the minimum amount of nitric acid. The resulting mixture is then added with stirring to a dilute solution (preferably less than about 0.1 molar) of ammonium hydroxide in slight excess. The resulting voluminous and gelatinous precipitate is separated and dried to a gel-type metallic oxide catalyst that may be used for the dehydrogenation or cracking of hydrocarbons at elevated temperatures in the range of 500 to 750° C.

Example VI

To a hot solution of 453.6 grams of aluminum nitrate nonahydrate and 32.5 grams of chromic nitrate nonahydrate in 100 cc. of water was added 134 cc. of 28 per cent aqua ammonia with stirring during about an hour. The resulting mixture was digested at about 70 to 80° C. for 2 hours. The resulting sol was diluted with 8 liters of cold water and was then added slowly with stirring to 10 liters of 0.23 normal ammonia. After settling overnight, the resulting precipitate was isolated by siphoning off the supernatant liquid and by filtering, but it was not washed. The filter cake was broken into pieces and was dried 8 days in air at 50 to 60° C. It was then crushed to 20–40 mesh granules. A part of this granulated mass was placed in a catalyst tube and was heated gradually in hydrogen during the course of 3 hours until a temperature of 550° C. was attained. On being tested for the dehydrogenation of normal butane to butylenes at a space velocity of 1000 volumes per volume per hour, the resulting catalyst, designated hereinafter as catalyst C, gave a constant conversion of 30 per cent, while the temperature was correspondingly automatically adjusted in the range of 550 to 640° C., for a period of 405 minutes.

For comparison, a catalyst, designated hereinafter as catalyst D, was made in substantially the same manner except that the excess dilute ammonia was added to the diluted sol. When tested for the dehydrogenation of normal butane under the same conditions, catalyst D had a running cycle of only 180 minutes, or less than half that characteristic of catalyst C.

The foregoing examples illustrate only a few of the many possible catalysts that may be prepared by the practice of this invention, but it is believed that, together with the general teachings contained herein, they are adequate as illustrations.

As obviously the invention may be practiced otherwise than as specifically described or illustrated, and as many modification and variations will be obvious to those skilled in the art of catalyst preparation, the invention should not be unduly restricted by the foregoing description and illustrative examples. In the appended claims it is intended to claim all inherent novelty in the invention.

I claim.

1. In a two-stage process of preparing a gel-type metal oxide catalyst, in which process a sol is prepared in the first stage by addition, to an aqueous solution of metallic salts corresponding to the metal oxides of said catalyst, of an aqueous solution of a soluble alkaline hydroxide in an amount equal approximately to two thirds of that amount required stoichiometrically to convert the salt to hydroxide, said salt solution being sufficiently concentrated to effect within about half an hour peptization of substantially all of any precipitated metal hydroxide, and in which process this sol is converted in the second stage to a gelatinous precipitate of metal hydroxide by mixing with a further amount of soluble alkaline hydroxide, the improvement in the second stage of said process which comprises the addition of the sol to such an amount of a dilute aqueous solution of the soluble alkaline hydroxide having a concentration not in excess of approximately 0.1 normal which slightly exceeds that amount of soluble alkaline hydroxide necessary to complement the amount previously used in preparing the sol in the first stage, so that the total amount of soluble alkaline hydroxide used slightly exceeds that stoichiometrically equivalent to the original metal salt, to cause precipitation of said metal hydroxide in gelatinous and voluminous state, and thereafter separating in conventional manner the gelatinous mass, washing it, and drying it to convert it to the oxide form.

2. A process of preparing a metal oxide catalyst which comprises adding an aqueous solution of a soluble alkaline hydroxide to an aqueous solution of a salt of a metal capable of producing a gelatinous hydroxide or hydrous oxide under conditions such that as the hydroxide of said metal is formed it is peptized to form a sol thereof, continuing said addition to substantially the point at which peptization to form said sol ceases, adding the resulting sol to such an amount of a dilute aqueous solution of a soluble alkaline hydroxide having a concentration not in excess of approximately 0.1 normal which slightly exceeds that amount of soluble alkaline hydroxide necessary to complement the amount previously used in preparing the sol, so that the total amount of soluble alkaline hydroxide used slightly exceeds that stoichiometrically equivalent to the original metal salt, to cause precipitation of said metal hydroxide in gelatinous and voluminous state, separating the gelatinous mass, washing it, and drying it to convert it to the oxide form.

3. A process as defined in claim 2 in which the soluble alkaline hydroxide is one that forms readily volatilizable salts with monobasic acids.

4. A process as defined in claim 2 in which said soluble alkaline hydroxide is ammonium hydroxide.

5. A process of preparing a metal oxide catalyst which comprises adding an aqueous solution of ammonium hydroxide having a concentration at least 10 normal, to an aqueous solution of a salt of a metal capable of producing a gelatinous hydroxide or hydrous oxide having a concentration at least 1 molar with respect to said salt, in an amount equal approximately to two thirds of that amount of ammonium hydroxide required stoichiometrically to convert the salt to the metal hydroxide, the addition of the solutions being made with agitation and under conditions such that as the hydroxide of said metal is formed it is peptized to a sol thereof, adding the resulting sol to such an amount of a dilute aqueous solution of ammonium hydroxide having a concentration not in excess of approximately 0.1 normal which slightly exceeds that amount of ammonium hydroxide necessary to complement the amount previously used, so that the total amount of ammonium hydroxide used slightly exceeds that stoichiometrically equivalent to the original metal salt, to cause precipitation of said metal hydroxide in gelatinous and voluminous state, separating the gelatinous mass, washing it, and drying it to convert it to the oxide form.

6. A process of preparing a gel-type metal oxide catalyst which comprises preparing by addition, to a solution of at least one corresponding metal salt of a monobasic acid for each metal oxide in the ultimate catalyst, of a solution of a soluble alkaline hydroxide in an amount equal approximately to two thirds of that amount of soluble alkaline hydroxide required stoichiometrically to convert the metal salt or salts in said solution to metal hydroxides, said metal salt solution being sufficiently concentrated to effect within about half an hour substantially complete peptization of any resulting precipitate, adding the resulting sol to such an amount of a dilute solution of a soluble alkaline hydroxide having a concentration not in excess of approximately 0.1 normal which slightly exceeds that amount of soluble alkaline hydroxide necessary to complement the amount previously used in preparing the sol, so that the total amount of soluble alkaline hydroxide used slightly exceeds that stoichiometrically equivalent to the original metal salt or salts, whereby each metal oxide of the ultimate catalyst is precipitated as a hydrous gelatinous and voluminous mass, and thereafter separating, washing and drying said mass to convert it to a gel-type metal oxide catalyst.

7. A process as defined in claim 6 in which said monobasic acid is nitric acid.

8. A process as defined in claim 6 in which said metal salt solution comprises at least one salt of a trivalent metal.

9. A process as defined in claim 6 in which said metal salt solution comprises at least one salt of a metal whose oxide is catalytically active for the dehydrogenation of hydrocarbons at elevated temperatures.

10. A process as defined in claim 6 in which said metal salt solution comprises at least one chromic salt.

11. A process as defined in claim 6 in which said metal salt solution is formed by melting at least one hydrated metal salt.

12. A process as defined in claim 6 in which said metal salt solution is at an elevated temperature while said solution of soluble alkaline hydroxide is being added thereto.

13. A process as defined in claim 6 in which said metal salt solution is a solution of chromic and aluminum nitrates.

14. A process as defined in claim 6 in which said metal salt solution is a solution of chromic, zirconium and cupric nitrates.

15. A process of preparing a gel-type chromium oxide catalyst which comprises adding to an approximately molar solution of violet chromic nitrate a concentrated solution of ammonia in an amount equal to approximately 70 per cent of that amount of ammonia required stoichiometrically to convert the chromic nitrate to chromium hydroxide, diluting the resulting sol with water to approximately 0.1 normal with respect to its chromium content, adding the diluted sol to such an amount of ammonia having a concentration of less than approximately 0.1 normal which slightly exceeds that amount of ammonia necessary to complement the amount previously used in preparing the sol, so that the total amount of ammonia used slightly exceeds that stoichiometrically equivalent to the original chromic nitrate, whereby chromium oxide is precipitated as a hydrous gelatinous and voluminous mass, and thereafter separating, washing and drying said mass to convert it to a gel-type metal oxide catalyst.

16. A process for the catalytic conversion of a hydrocarbon to change its carbon to hydrogen ratio which comprises subjecting the hydrocarbon at conversion conditions of temperature to contact with a metal oxide catalyst prepared by adding an aqueous solution of a soluble alkaline hydroxide to an aqueous solution of a salt of a metal capable of producing a gelatinous hydroxide or hydrous oxide under conditions such that as the hydroxide of said metal is formed it is peptized to form a sol thereof, continuing said addition to substantially the point at which peptization to form said sol ceases, adding the resulting sol to such an amount of a dilute aqueous solution of a soluble alkaline hydroxide having a concentration not in excess of approximately 0.1 normal which slightly exceeds that amount of soluble alkaline hydroxide necessary to complement the amount previously used in preparing the sol, so that the total amount of soluble alkaline hydroxide used slightly exceeds that stoichiometrically equivalent to the original metal salt, to cause precipitation of said metal hydroxide in gelatinous and voluminous state, separating the gelatinous mass, washing it, and drying it to convert it to the oxide form.

17. A process for the catalytic dehydrogenation of a hydrocarbon which comprises subjecting the hydrocarbon at a dehydrogenation temperature to contact with a catalyst prepared by adding an aqueous solution of a soluble alkaline hydroxide to an aqueous solution of a salt of a metal capable of producing a gelatinous hydroxide or hydrous oxide under conditions such that as the hydroxide of said metal is formed it is peptized to form a sol thereof, continuing said addition to substantially the point at which peptization to form said sol ceases, adding the resulting sol to such an amount of a dilute aqueous solution of a soluble alkaline hydroxide having a concentration not in excess of approximately 0.1 normal which slightly exceeds that amount of soluble alkaline hydroxide necessary to complement the amount previously used in preparing the sol, so that the total amount of soluble alkaline hydroxide used slightly exceeds that stoichiometrically equivalent to the original metal salt, to cause precipitation of said metal hydroxide in gelatinous and voluminous state, separating the gelatinous mass, washing it, and drying it to convert it to the oxide form.

18. A process for the catalytic dehydrogenation of an aliphatic hydrocarbon to form an aliphatic hydrocarbon of a greater degree of unsaturation which comprises subjecting the hydrocarbon at a temperature within the range of approximately 350° C. to approximately 750° C. to contact with a catalyst prepared by adding an aqueous solution of a soluble alkaline hydroxide to an aqueous solution of a salt of a metal capable of producing a gelatinous hydroxide or hydrous oxide under conditions such that as the hydroxide of said metal is formed it is peptized to form a sol thereof, continuing said addition to substantially the point at which peptization to form said sol ceases, adding the resulting sol to such an amount of a dilute aqueous solution of a soluble alkaline hydroxide having a concentration not in excess of approximately 0.1 normal which slightly exceeds that amount of soluble alkaline hydroxide necessary to complement the amount previously used in preparing the sol, so that the total amount of soluble alkaline hydroxide used slightly exceeds that stoichiometrically equivalent to the original metal salt, to cause precipitation of said metal hydroxide in gelatinous and voluminous state, separating the gelatinous mass, washing it, and drying it to convert it to the oxide form.

19. A process as defined in claim 6 in which said salt solution is a solution of uranyl and zirconium nitrates.

MARYAN P. MATUSZAK.